(No Model.) 4 Sheets—Sheet 1.
D. N. HURLBUT.
MACHINE FOR MANUFACTURING TUBING.
No. 441,845. Patented Dec. 2, 1890.
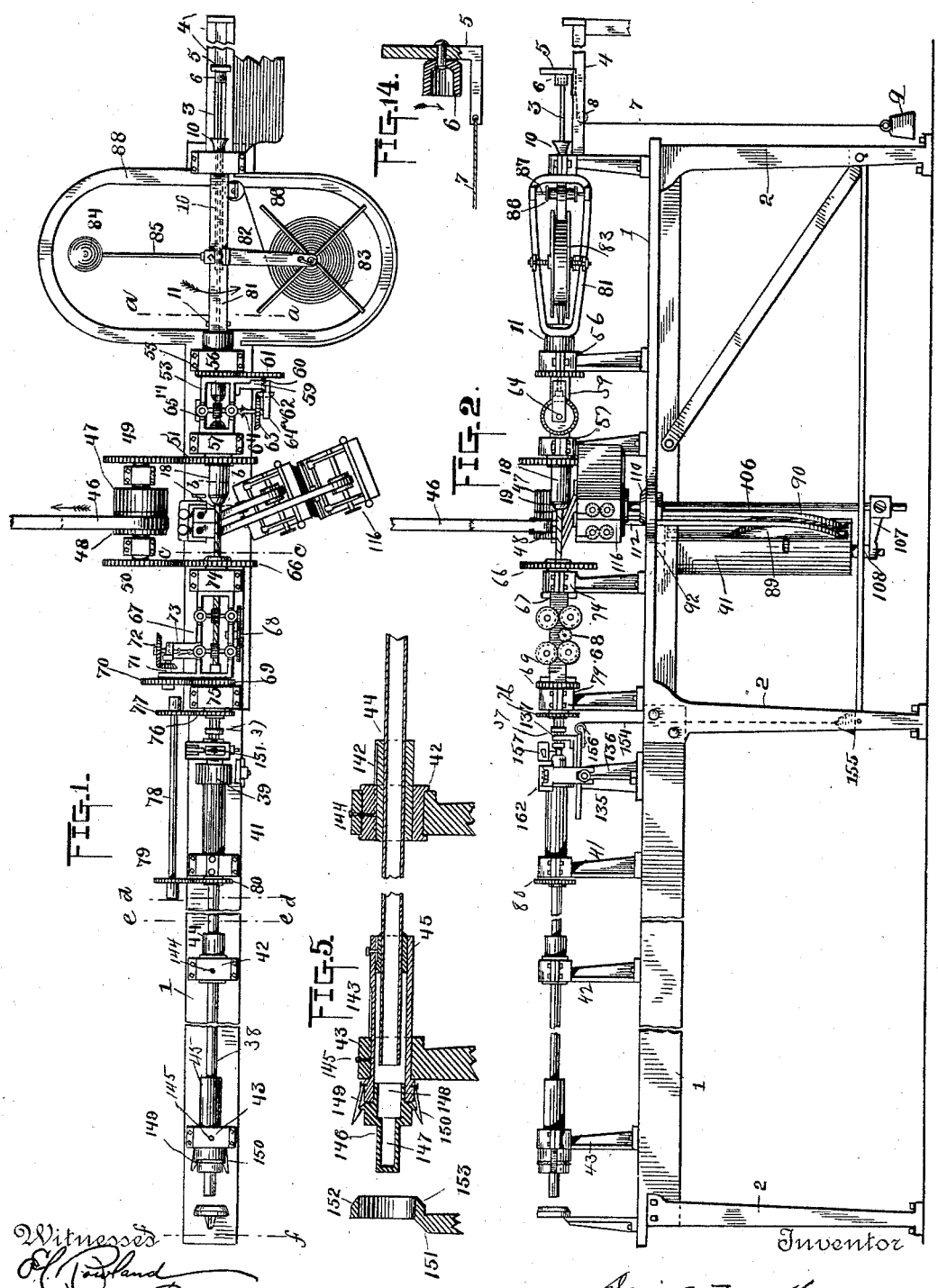

(No Model.) 4 Sheets—Sheet 2.
D. N. HURLBUT.
MACHINE FOR MANUFACTURING TUBING.
No. 441,845. Patented Dec. 2, 1890.
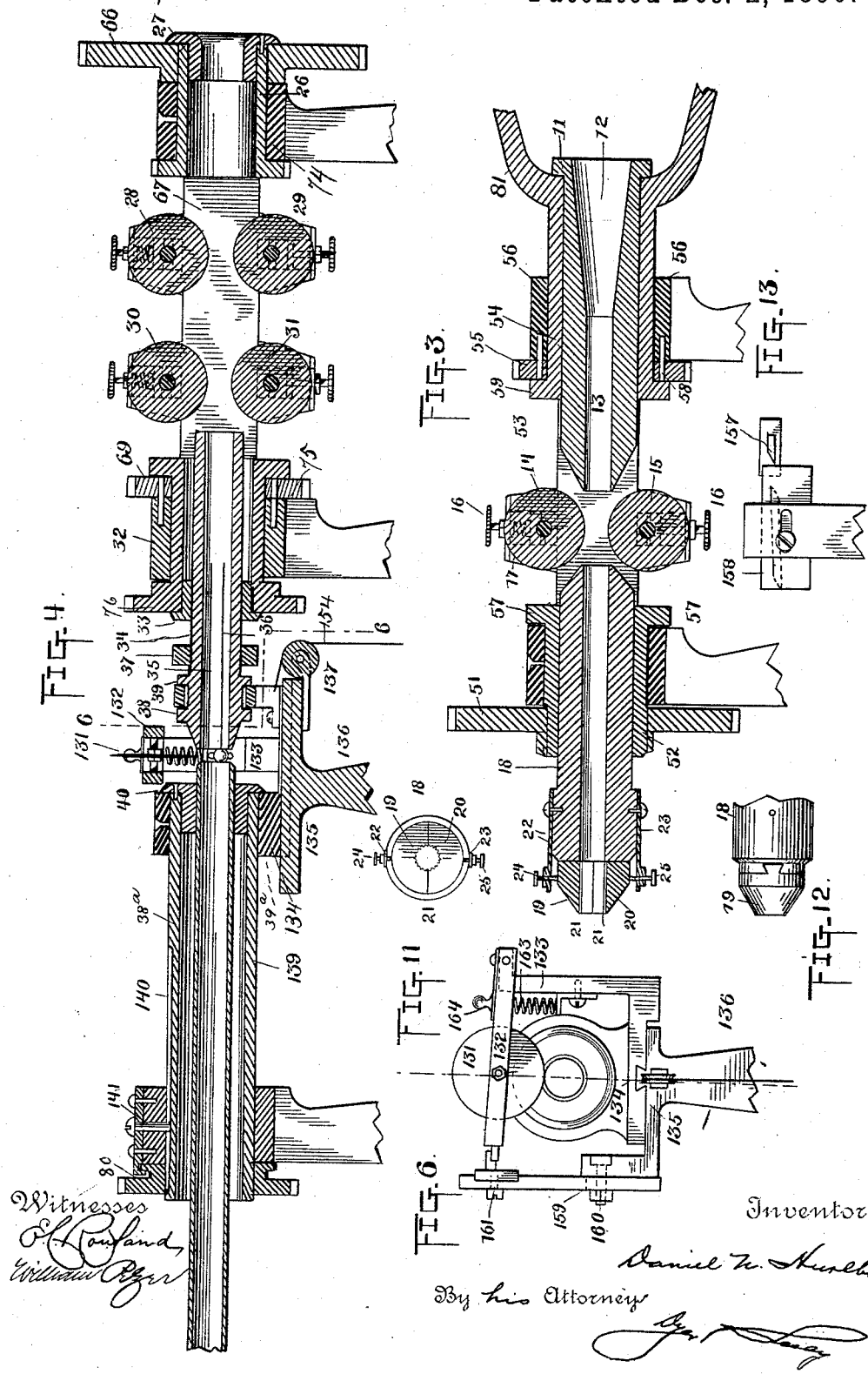

(No Model.) 4 Sheets—Sheet 3.
D. N. HURLBUT.
MACHINE FOR MANUFACTURING TUBING.
No. 441,845. Patented Dec. 2, 1890.
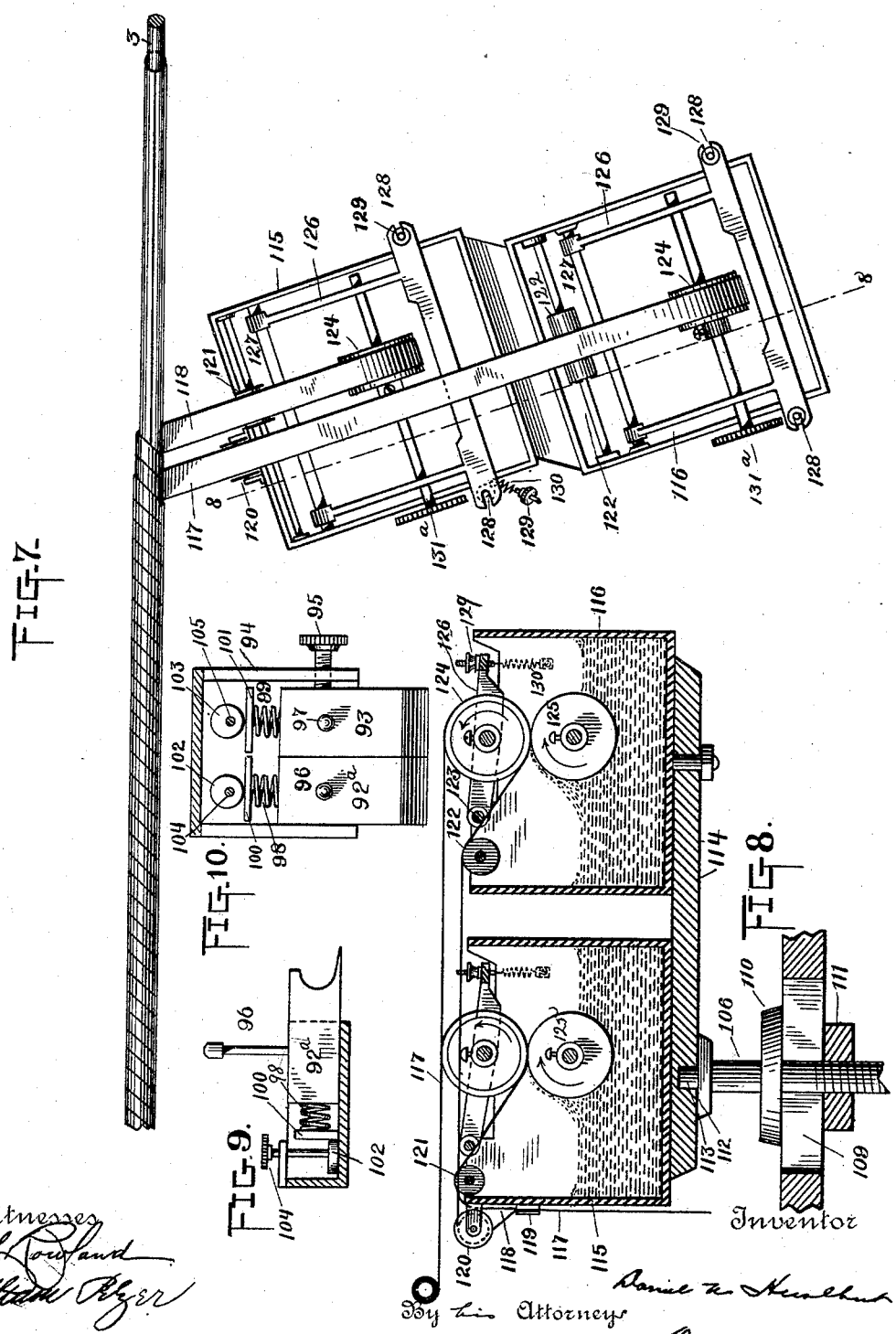

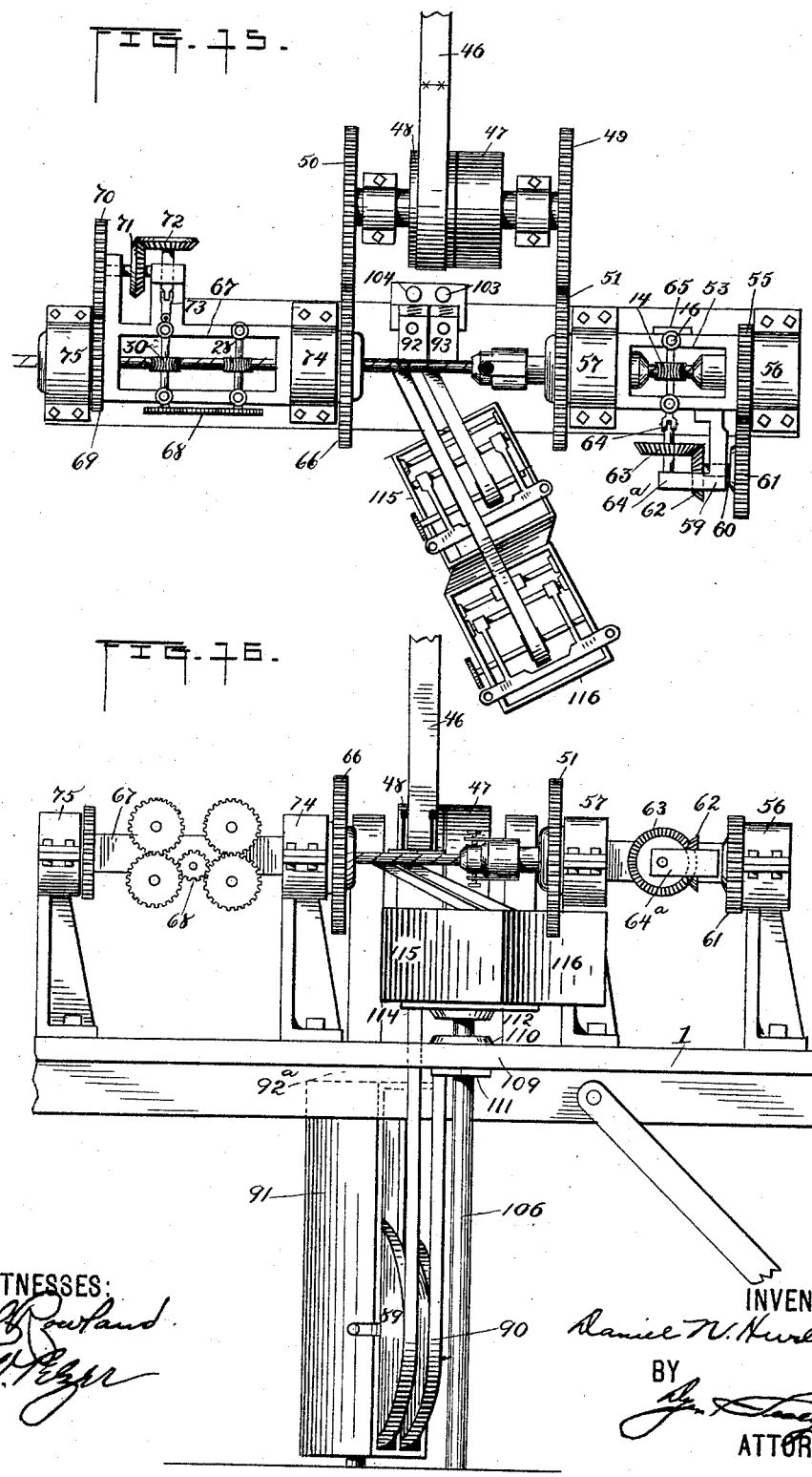

UNITED STATES PATENT OFFICE.

DANIEL N. HURLBUT, OF NEW YORK, N. Y.

MACHINE FOR MANUFACTURING TUBING.

SPECIFICATION forming part of Letters Patent No. 441,845, dated December 2, 1890.

Application filed July 5, 1889. Serial No. 316,601. (No model.)

*To all whom it may concern:*

Be it known that I, DANIEL N. HURLBUT, a citizen of the United States, residing at the city of New York, in the county and State of New York, have invented a new and useful Machine for Manufacturing Tubing, of which the following is a specification.

My invention relates to that class of machines wherein the tube is formed around a mandrel, and is more especially designed for the manufacture of paper tubing.

My invention consists in mechanism for supplying the tape to the mandrel, for feeding the mandrel and tape together through the machine, for forming the core-tape around the mandrel, for covering the core-tape with a wrapping tape or tapes wound spirally, for pasting the wrapping-tapes, for cutting the tube into lengths, for preventing the tube turning in relation to the mandrel, and in various other devices and combinations of devices hereinafter more particularly described, and pointed out in the claims.

In the accompanying drawings, forming a part hereof, Figure 1 is a plan view of my tube-making machine. Fig. 2 is a side view thereof. Fig. 3 is a central longitudinal vertical section of the parts between the lines $a$ $a$ and $bb$, Fig. 1. Fig. 4 is a section taken on the same plane as Fig. 3 of the parts between the lines $cc$ and $dd$. Fig. 5 is a section taken on the same plane as Figs. 3 and 4 of the parts between the lines $ee$ and $ff$. Fig. 6 is a vertical cross-section taken on the line 6 6 of Fig. 4. Fig. 7 is an enlarged plan view of the paste-boxes and connected parts, the manner of wrapping the tapes being also shown. Fig. 8 is a vertical longitudinal section of the same, taken on the plane of the line 8 8, Fig. 7. Figs. 9 and 10 are detail views of the pressers used to guide, press, and smooth the tapes onto the core of the tube. Figs. 11 and 12 are detail views of an adjustable clutch to hold the tube and mandrel firmly. Fig. 13 is an enlarged elevation of the finger and lip for operating the cutter, and Fig. 14 is an enlarged vertical section of the support for the mandrel at one end. Fig. 15 is a plan view of a portion of the machine, taken between the bearings 56 and 75. Fig. 16 is an elevation of the same.

1 in the drawings is the bed-plate of the machine, which is suitably supported on the standards 2.

3 is the mandrel around which the tube is formed. This mandrel is preferably made in several lengths threaded or socketed together, so that in length it shall be equal to about the length of the machine, and should be of sufficient strength to withstand the crushing action of the feeding devices. Preferably the several sections of the mandrel are of the same length as the length of the tubes desired. When so formed, the cutting device, hereinafter described, is operated to cut near the junction between the sections, so that the section of mandrel and length of tube may be taken from the machine together.

I will first describe the feeding mechanism, assuming, for facility of description, that the mandrel alone is to be fed through the machine without being rotated.

4 is a long table, grooved as shown in Fig. 1. In this groove slides the pushing-piece 5, upon the upright arm of which is mounted the recessed rotating piece 6, into which one end of the mandrel is placed. To the horizontal arm of the pushing-piece 5 is attached a cord 7, which runs in the groove of the table toward and over the pulley 8, and has secured to it the weight 9. This weight is about equal to the weight of the mandrel, and serves to pull the mandrel into the machine until it is clasped by the feed-rollers.

10 is a section of the guide-tube for the mandrel, the whole guide-tube being formed in several sections, serving to guide and support the mandrel in its passage through the machine. This tube 10 serves also to separate the material for the tube and the mandrel, the mandrel being inside the tube and the material outside, whereby there will be no contact between mandrel and material until they are about to enter the forming-die.

11 is the forming-die, (shown in section, Fig. 3,) having a cone-shaped mouth 12 and cylindrical throat 13.

14 15 are feed-rollers having slightly-fluted peripheries mounted in bearings in a rotating frame, hereinafter more particularly described. These rollers are preferably adjustable so as to be adaptable for different sizes of work, and one of them is preferably provided with a spring, so as to cause it to exert a yielding pressure on the mandrel.

16 are the adjusting-screws for the rollers, and 17 is a coiled spring provided for one of them, and located, as shown, so that its tendency will be always to press the roller onto the mandrel.

18 is another section of the guide-tube for the mandrel, of uniform bore, with the throat 13 of the forming-die provided at its exit end with a clutch formed in two parts 19 and 20, each part being provided with longitudinal serrations 21 to prevent slipping of the tube and tube material while rotating. The parts 19 and 20 have a dovetail connection with the end of the tube 18, as shown in Fig. 12.

22 23 are flat springs secured at one end to the tube 18, and at the other bearing one upon the part 19 and the other upon the part 20, and being provided with set-screws 24 25 to adjust the degree of spring-pressure. When the two parts 19 and 20 are in contact, as shown at Fig. 11, the circle described by the tops of the serrations will be smaller than the bore of tube 18, whereby adjustment for different sizes up to the diameter of bore of tube 18 is permitted.

26 is a hollow support for a portion of the guide-tube for the mandrel, but of much larger diameter than the mandrel.

27 is a removable section fitting into one end of support 26, as shown, different sizes being used for different-sized mandrels.

28, 29, 30, and 31 are feed-rollers similar in construction and operation to the rollers 14 and 15, described above.

32 is another support, similar to 26, and having a removable section 33, similar to section 27, for the same purpose.

34 is another section of the guide-tube for the mandrel, fitting into and supported by the section 33. One end of this tube 34 is split longitudinally, as shown in Fig 4, and sprung. 35 and 36 designate two of the slits, of which there are preferably four. Surrounding the split end of the tube is the rubber ring 37, which by moving on the split end of the tube will expand or compress the opening, thus permitting the degree of grip on the mandrel to be regulated.

38 is another section of the guide-tube for the mandrel, supported, similarly to the portion 34, by means of the support in bearing 39 and removable piece 40 at one end and supports 41, 42, and 43 and sliding pieces 44 45 interposed throughout its length.

Besides the motion of translation which the mandrel has, it has also a motion of rotation for a purpose as will appear hereinafter. This motion of rotation is effected by means of the feed-rollers above referred to, and so that there will be no retardation of the rotation of the mandrel by its guiding-tube. The several sections thereof, except the first, are also rotated at the same speed as the mandrel. I will describe the construction for effecting the rotations above referred to, and as the main object of rotating the mandrel is to wrap the core of the tube in process of manufacture with a tape or tapes I will in this connection describe also the means of supplying the core-tape and winding-tapes for the tube to the mandrel.

46 is the driving-belt, belting, as required, onto one or the other of the pulleys 47 48, one of which is a fast and the other a loose pulley. On either end of the pulley-shaft is a gear 49 50. The gear 49 engages with the gear 51, which is mounted on a hub 52, formed on the rectangular rotating frame 53. On the opposite end of this rectangular frame is formed another hub 54, surrounding which is a pinion 55. The hubs of the rectangular frame are supported in bearings 56 57, and the frame is rotated therein through the gear 51, which is rigidly secured to it. The pinion 55 is rigidly secured by a number of pins 58 58 to the bearing 56, and does not rotate.

Carried by the frame 53 is an arm 59, in which is mounted a shaft 60, which carries at one end the pinion 61 and at the other end the bevel-gear 62. The pinion 61 meshes with the stationary pinion 55, and has a motion of revolution around it transmitted to it by the arm 59 of the rectangular frame. The engagement of the teeth of the two pinions 55 and 61 rotates the pinion 61, thus driving the shaft 60 and bevel-gear 62.

63 is a bevel-gear free to rotate on a stud 64 on the arm 59, driven by the bevel-gear 62. To the face of the bevel-gear 63 is secured one end of the tumbling-shaft 64, the other end of which is secured to the shaft of the upper feed-roller 14, the lower feed-roller 15 being driven by means of the pinion 65 on the end of the shaft of the upper feed-roller. By means of this tumbling-shaft arrangement the adjustment of the feed-rollers to the requirements of different-size tube is permitted through the adjusting-screw 16.

The gear 50 engages with a gear 66, fast on the hub of another rotating rectangular frame 67, in which is mounted the feed-rollers 28, 29, 30, and 31, already referred to. The arrangement for driving these feed-rollers so that they will impart to the tube a motion of rotation, as well as of translation, is similar to that described in connection with the frame 53, except that there being two pairs of feed-rollers in this frame there is an intermediate gear 68 to transmit motion from one set of gears of the feed-roller shafts to the other.

69 is the stationary toothed disk.

70 is the gear, having the motion of revolution around 69.

71 and 72 are the bevel-gears for driving the tumbling-shaft 73, and 74 75 the bearings for the rectangular frame.

On the hub of the frame 67 toward the exit end is mounted a gear 76, which drives a gear 77 on shaft 78, another gear 79 on the same shaft driving the gear 80, secured to and driving the continuation of the guiding-tube for the mandrel.

As will be seen, the forming-die and the sections 18, 26, and 34 of the guiding-tubes for the mandrel, being secured in the rectangular rotating frames, will be rotated with said frame, and therefore will not tend to set up friction to retard the rotation of the mandrel. This also may be said of the section 38 of the guide-tube for the mandrel which is driven by the gear 80.

Formed in one piece with the rectangular frame 53 is the yoke-piece 81, and on the end of an arm 82 are projections which form bearings for the supply-spool 83, the weight of the spool and its contents being counterbalanced by the counter-balance 84 at the end of an arm 85, projecting from the yoke-piece 81. The rotation of the yoke-piece will of course rotate the supply-bobbin.

86 is a guide-roller for the tape, mounted on a spindle 87, having bearings in the yoke-piece 81.

88 is a guard within which the yoke-piece and connected parts rotate for the purpose of preventing injury to operatives.

Starting with one end of the mandrel in the forming-die and the other end in the rotating piece 6, the operator will bring the tape around the roller 86 and along the mandrel, threading the end of the tape and mandrel together into the mouth of the forming-die, the weight 9 forcing them both together between the first pair of feed-rollers. The belt being then shifted to the fast pulley, the machine will feed the mandrel toward the exit end and at the same time draw a supply of tape from the supply-spool 83, which is also rotating with the mandrel. The passage of the tape through the forming-die with the mandrel will cause the tape to take a tube formation with butt edges, which will be rotated with the mandrel by the rotation of the feed-roller, and which will be prevented from slipping on the mandrel by the longitudinal serrations 21 in the gripping-jaws 19 and 20, which are used at a point where the greatest likelihood of slip exists—that is, at a point near where the outer wrapping is applied to the core already formed. As shown in Figs. 1 and 7, this wrapping consists of two tapes, which are preferably of the same material as the core. These tapes are fed to the core at an angle, as shown, so as to be wound spirally thereon, and are coated with a paste on the surface to come in contact with the core, in a manner hereinafter to be described, and are supplied from supply-spools 89 and 90, mounted in a box 91, pivoted on a vertical pin 92. The operator having properly applied the coated side of the winding-tapes to the core, the rotation of the latter will wind them upon it, while its forward motion and the angle at which the tapes are fed will cause the winding-tapes to be wound spirally, as shown. To secure the adherence of the winding-tapes and core at the points of application of the former to the latter, the adjustable pressers 92ª and 93 are used. (Shown in detail in Figs. 9 and 10.) These pressers are held in a frame 94 by the set-screw 95 and are supplied with handles 96 and 97 for convenience. At the rear end the pressers are in contact with the coiled springs 98 99, which are held in place by the plates 100 and 101. To regulate the tension of the coiled springs, the cams 102 and 103 on the ends of the regulating-screws 104 and 105 are used. At the front end the pressers are of the form of a half-circle of the size of the tube being formed with a lip projection, as shown. Passing the point where the wrapping is applied to the central core, the tube, which is now in its completed form, is fed by the feed-rollers through the several sections of the guide-tube, which are of enlarged diameter to correspond with the increased diameter of the tube to the exit end of the machine, a cutting mechanism hereinafter described automatically operating to cut the formed tube into determined lengths, the cut being made, preferably, at the point where two sections of the mandrel meet, so that the operator will receive a section of mandrel and piece of tube of equal length, which he can separate, the section of mandrel being returned to the feed end of the machine to be used again.

The pasting apparatus hereinbefore referred to is shown most clearly in Figs. 7 and 8. 106 is a spindle carried in arm 107, extending from a pin 108, projecting from box 91. At its upper end this spindle passes through a longitudinal slot 109 of the bed-plate, and has a collar 110 surrounding it above the slot resting on the bed-plate and a nut 111 below the bed-plate working on a threaded portion of the spindle. Upon another collar 112, on the top of the spindle, is a pivot 113, upon which the plate 114 is mounted and swings. Upon this plate 114 is supported the paste-boxes 115 and 116, the latter being pivoted to it so as to be adjustable thereon. As the box 91 is pivoted on a vertical axis 92 and the spindle 106 is supported by it, the spindle and parts supported by it may be swung in a longitudinal direction to the extent of slot 109 and may be clamped by the nut 111 in the desired position. The object of this is to permit of regulating the angle between the winding-tapes and the core-tape, the box 116 having a further adjustment so as to bring the tape fed through it to such an angle as is required by the enlarged condition of the tube.

117 and 118 are the tapes which are wound upon the supply-spools located in the box 91, and are thence drawn in the same plane, but at a distance apart equal to about one-half the width of the tape, so that one tape will break joints with the other when wound.

119 is a slotted piece on the box 115, one such piece being provided for each tape, which serves to guide the tapes to the guide-rollers 120 121, the roller 120 being for the tape 117 and the roller 121 for the tape 118. The tape 117 passes from the roller 120 over the top of box 115 to and over guide-roller 122, under guide-roller 123, and between rollers 124 and 125, thence back over the boxes to be wound, as above described. Paste is applied to one side only of the tape in its passage between the rollers 124 and 125, the latter roller being covered with felt or similar substance to collect a quantity of the paste (shown by broken lines) in the box, and the roller 124 being supported in bearings in a pivoted frame to admit of adjusting the pressure between the rollers 124 and 125. The roller 124 is smaller than 125, and by being geared together there is a rubbing motion between them or against the tape which smooths down the paste. 126 is the frame referred to, which is three-sided, as shown, the pieces forming its two opposite sides being pivotally mounted at one end on the shaft 127 and at the other end united by a cross-arm, in each end of which is a slot 128, capable of receiving the shank of an adjusting-screw 129, one end of which adjusting-screw is connected to the spiral spring 130, which in turn is secured to the side of the box, the other end of the adjusting-screw being provided with a nut, the bottom of which rests on the top of the cross-bar. By adjusting this nut the space between the rollers 124 and 125 can be regulated so that more or less paste may be applied to the tape, and the tension on the tape may also be regulated. A gear 131 on the end of the shaft of the roller 124 drives a similar gear on the shaft of the roller 125, the depth of the teeth of the gears being sufficiently great to permit of considerable adjustment between the rollers 124 and 125.

As the arrangement for pasting the tape 118 is similar to the arrangement for pasting tape 117, the various parts in both arrangements have been similarly designated, and no separate description will be given of those for tape 118.

The arrangement above referred to for automatically cutting the formed tube into determined lengths is shown in Figs. 1, 2, 4, 5, 6, and 13.

131 is a knife mounted to rotate in a frame 132, which frame is hinged to a rearwardly-projecting lug, (shown in dotted lines, Fig. 6,) formed on an upright 133, extending from the base-plate of the bearing 39. This bearing is formed with a groove in its bottom to slide on the dovetail rib 134, formed on the plate 135 of the standard 136. Another standard 137, extending from the base-plate of the bearing 39, encircles the guide-tube 34 between two flanges 138, whereby rectilinear motion imparted to the bearing 39 will be transmitted to the guide-tube 34.

139 is the sliding support, already mentioned, for the guide-tube. Cut upon the top of this support is the longitudinal slot 140, into which is dropped a pin 141 from the bearing 40, the purpose of the pin and slot being to permit a longitudinal movement of the support for the guide-tube and yet prevent any rotation thereof.

44 and 45, before referred to, are other sliding supports for the guide-tube, having slots 142 and 143, respectively, engaging with pins 144 and 145 of the bearings 42 and 43. At the end of the support 45 is detachably secured a cup-piece 146, with a recess 147 to receive the mandrel and recess 148 to receive the guiding-tube. This piece 146 is secured to the end of the support 45 by means of spring-clip hooks 149 and 150, secured to the support 45, catching over a lip on the cup-piece, as shown.

151 is a stop having beveled edges 152 and 153.

154 is a rope, with weight 155 attached at one end, the other end being fastened to the sliding bearing 39 and running over pulley 156.

The operation of the parts thus far described, in connection with the cutting apparatus, is as follows: Supposing it to be required to cut the tube into lengths about equal to the distance between the rotary cutting-knife and stop 151, then when the mandrel reaches the bottom of recess 147 of the cup-piece, having no outlet, it will force the cup-piece along with it, carrying the sliding supports 45, 44, and 139. The latter support being rigidly connected to the bearing 39 will carry it along with it, and as the knife-frame and support 34 are also connected to this bearing the knife and support will be carried along with it. When the mandrel has pushed the parts far enough to bring the inclined faces of the spring-clips into contact with the beveled edges of the stop, the cup-piece will have been projected through the opening in the stop. A slightly farther advance will raise the spring-clip altogether out of engagement with the lip on the cup-piece and the latter will be pushed away from the support 45 and will fall off. No further force tending to push the parts forward, the weight will return them to their original position. While the parts are being thus caused to travel toward the exit end of the machine with the mandrel, the rotary knife is brought into operation to cut the material of the tube at the point determined. This is effected by locating in the path of a finger 157 on the bearing-frame of the knife a lip 158, located on a standard rising from plate 135. The lip 158 is inclined in the direction of the exit end of the machine to the degree required by the thickness of tube to be cut. The finger 157 and lip 158 have reversely-beveled opposing faces. As will be seen, the knife is mounted so as to act between the ends of two sections of the guiding-tube and is normally above the surface of the sections of the guiding-tube. Now, when the mandrel pushes the knife and other parts forward the finger 157, engaging with lip 158, will be forced under the latter and down by it, carrying the knife down between the ends of the contiguous sections of supporting-tube onto the tube to be cut, the length of the lip being sufficient to hold the knife in the cutting position until a complete cut is made, and the inclination of the lip being sufficient to cause the knife to cut through the tube thickness. The knife traveling longitudinally at the same speed as the tube and being rotated by it will make a circular cut and not a spiral one.

For the purpose of regulating the depth of cut to suit different thicknesses of tube, the standard upon which the lip 158 is mounted is provided with a vertical slot 159, through which a set-screw 160 works, whereby the standard may be vertically adjusted. To adjust the lip 158 to different diameters of tubes, it is provided with a set-screw 161, working in a longitudinal slot 162 in the standard. A coiled spring 163 opposes the downward movement of the rotary knife and causes it to act with a yielding movement on the tube and to rise instantly out of the cut made when the finger 157 passes the lip 158.

164 is a pivoted spring-clip, which when in the position shown in Fig. 6 prevents the rotary knife from being turned on its hinge, but when swung to one side permits the knife to be swung back, whereby access may be had to the parts in proximity to it.

What I claim is—

1. In a tube-making machine, the combination of a forming-die, a mandrel, a spool located near the feed end of the mandrel, adapted to furnish material to said mandrel in the direction of its axis, means for feeding and rotating said mandrel, a presser arranged in the path of said mandrel after it leaves the forming-die, and a supply-spool arranged at an angle to the mandrel, substantially as set forth.

2. In a tube-making machine, the combination of a forming-die, a mandrel, a spool located near the feed end of the mandrel, adapted to furnish material to said mandrel in the direction of its axis, means for feeding and rotating said mandrel, a presser arranged in the path of said mandrel after it leaves the forming-die, and a cutter, substantially as set forth.

3. In a tube-making machine, the combination of a forming-die, a mandrel, a spool located near the feed end of the mandrel, adapted to furnish material to said mandrel in the direction of its axis, feed-rollers for said mandrel and means for rotating the same, whereby a motion of translation is imparted to the mandrel, a frame wherein said feed-rollers are mounted, and means for rotating said frame, whereby a motion of rotation is imparted to the mandrel, substantially as set forth.

4. In a tube-making machine, the combination of a forming-die, a mandrel, a spool located near the feed end of the mandrel, adapted to furnish material to said mandrel in the direction of its axis, feed-rollers for said mandrel, means for rotating said feed-rollers, a frame wherein said feed-rollers and forming-die are mounted, and means for rotating said frame, substantially as set forth.

5. In a tube-making machine, a feeding device comprising feed-rollers, a rotating frame in which said feed-rollers are mounted, whereby a motion of revolution is imparted to said feed-rollers, a gear-wheel on said frame revolving around a stationary toothed disk, said disk, and a train of gears operated by said gear-wheel, whereby a motion of rotation is imparted to said feed-rollers, substantially as set forth.

6. In a tube-making machine, an adjustable feeding device comprising feed-rollers, a rotating frame in which said feed-rollers are mounted, means for adjusting said feed-rollers toward and from one another in said frame, a tumbling-shaft connected with the shaft of one of said feed-rollers, a gear on said frame revolving around a stationary toothed disk, and a train of gears operated by said gear-wheel to drive said tumbling-shaft, substantially as set forth.

7. In a tube-making machine, the combination of a forming-die, a mandrel, feed-rollers, means for imparting to said feed-rollers a motion of rotation and a motion of revolution, a guide-tube for the mandrel, located to receive the mandrel after it leaves the first set of feed-rollers, means for rotating said guide-tube, and a clutch on the exit end of said guide-tube, substantially as set forth.

8. In a tube-making machine, the combination of a forming-die, a mandrel, feed-rollers, means for imparting to said feed-rollers a motion of rotation and a motion of revolution, a guide-tube for the mandrel, located to receive the mandrel after it leaves the first set of feed-rollers, means for rotating said mandrel, a clutch having serrated gripping-surfaces, and means for regulating the friction of said clutch upon said mandrel, substantially as set forth.

9. In a tube-making machine, the combination, with a forming-die and mandrel, of feed-rollers for said mandrel, means for imparting to said feed-rollers a motion of rotation and a motion of revolution, a sectional guide-tube for the mandrel, and means for rotating each section of the guide-tube at a speed uniform with the speed of rotation of the mandrel, substantially as set forth.

10. In a tube-making machine, the combination, with a forming-die and mandrel, of a sectional guide-tube for said mandrel, feed-rollers for feeding said mandrel through said forming-die and guide-tube, means for rotating said mandrel and guide-tube at a uniform speed, a cutter located to cut between two sections of the guide-tube, and means actuated by said mandrel to operate said cutter, substantially as set forth.

11. In a tube-making machine, a cutting device comprising a rotary cutter or knife, a sliding piece upon which said cutter is mounted, a finger projecting from said piece, a lip in the path of said finger, and means for bringing said finger to and under said lip, whereby a downward motion of the cutter is produced, substantially as set forth.

12. In a tube-making machine, a cutting device comprising a rotary cutter, a pivoted frame in which said cutter is mounted, a sliding piece on which said frame is pivoted, a section of guide-tube contiguous to each side of the cutter, the last section being provided with a closed end, sliding connections between said guide-tubes and their supports, a mandrel and feed-rollers therefor, whereby the mandrel will be fed into contact with the closed end of the last section of guide-tube and force the guide-tubes and sliding piece toward the exit end of the machine, a finger on the sliding piece, and a lip interposed in the path of the finger, whereby the knife is brought into cutting operation, substantially as set forth.

13. In a tube-making machine, the combination of a sliding piece, a knife mounted thereon, a mandrel and feed-rollers therefor, a contact-piece for said mandrel, adapted to be pushed by it, a connection between said contact-piece and said sliding piece, means for detaching said contact-piece to remove it from the path of the mandrel, and a weight for retracting said sliding piece to its original position, substantially as set forth.

14. In a tube-making machine, the combination of a sliding piece, a cutter mounted thereon, a mandrel and feed-rollers therefor, a contact-piece adapted to be pushed by said mandrel, a connection between said contact-piece and sliding piece, spring-clips detachably securing said contact-piece and connection, a stop adapted to release said contact-piece from said connection, and a weight for retracting said sliding piece and connection, substantially as set forth.

15. In a tube-making machine, the combination of a forming-die, a mandrel, feed-rollers arranged near the exit end of said die, a pushing-piece adapted to push the mandrel, and a weight acting on said pushing-piece to feed the mandrel through said die to the feed-rollers, substantially as set forth.

16. In a tube-making machine, the combination of a forming-die, a mandrel, feed-rollers arranged near the exit end of said die, means for imparting to said feed-rollers a motion of rotation and a motion of revolution, a pushing-piece, a receiver free to rotate, located on said pushing-piece, to receive one end of the mandrel, and a weight acting on said pushing-piece to feed the mandrel through said die to the feed-rollers, substantially as set forth.

17. In a tube-making machine, the combination of a rotary forming-die, a mandrel, means for feeding and rotating said mandrel in its passage through the machine, a spool adapted to supply material to said mandrel in the direction of its axis, and means for rotating said spool at a speed uniform with the speed of the rotary forming-die, substantially as set forth.

18. In a tube-making machine, the combination of a rotary forming-die, a mandrel, means for feeding and rotating said mandrel in its passage through the machine, a yoke-piece rotated with said forming-die, and a spool adapted to supply material to said mandrel in the direction of its axis, mounted on said yoke-piece and rotating therewith, substantially as set forth.

19. In a tube-making machine, the combination of a rotary forming-die, a mandrel, means for feeding and rotating said mandrel in its passage through the machine, a yoke-piece rotated with said forming-die, a spool adapted to supply material to said mandrel in the direction of its axis, and a guide-roller for the supply, mounted on said yoke-piece and rotating therewith, substantially as set forth.

20. In a tube-making machine, the combination of a rotary forming-die, a mandrel, means for feeding and rotating said mandrel in its passage through the machine, a yoke-piece rotated with said forming-die, a spool adapted to supply material to said mandrel in the direction of its axis, mounted on an arm carried by said yoke-piece, and a counter-balance carried by an arm opposite the spool-carrying arm, substantially as set forth.

21. In a tube-making machine, a presser comprising a spring-pressed block having a semicircular recess adapted to press upon the tube being formed, a spring for exerting a yielding pressure upon said block, and an adjusting-screw for regulating the tension on said spring, substantially as set forth.

22. In a tube-making machine, a presser comprising a spring-pressed block having a semicircular recess, adapted to press upon the tube being formed, and a lip projection adapted to guide the winding material to the tube-core, substantially as set forth.

23. In a tube-making machine, a presser comprising a spring-pressed block having a semicircular recess, adapted to press upon the tube being formed, a spring for exerting a yielding pressure upon said block, a plate between which and the back of the block said spring is confined, and a cam-shaped piece for regulating the tension on said spring, substantially as set forth.

24. In a tube-making machine, the combination of a forming-die, a mandrel, a supply-spool located near the feed end of said die, adapted to supply material to said mandrel in the direction of its axis, means for feeding and rotating said mandrel, and a supply-spool located near the exit end of said forming-die, adapted to supply material to said mandrel at an angle to the direction of its axis, substantially as set forth.

25. In a tube-making machine, the combination of a forming-die, a mandrel, a supply-spool located near the feed end of said die, adapted to supply material to said mandrel in the direction of its axis, means for feeding and rotating said mandrel, a supply-spool located near the exit end of said forming-die, adapted to supply material to said mandrel at an angle to the direction of its axis, and rollers adapted to guide said material, substantially as set forth.

26. In a tube-making machine, the combination of a forming-die, a mandrel, a supply-spool located near the feed end of said die, adapted to supply material to said mandrel in the direction of its axis, a supply-spool located near the exit end of said mandrel, adapted to supply material to said mandrel at an angle to the direction of its axis, and a bearing-box for said last-mentioned supply-spool, adapted to be swung in a vertical plane, substantially as set forth.

27. In a paper-tube-making machine, the combination of a forming-die, a mandrel, a supply-spool located near the feed end of said die, adapted to supply material to said mandrel in the direction of its axis, means for feeding and rotating said mandrel, a supply-spool located near the exit end of said mandrel, adapted to supply material to said mandrel at an angle to the direction of its axis, a receptacle adapted to receive paste, and guides for guiding the supply from the last-named supply-spool to and through said receptacle to the mandrel, substantially as set forth.

28. In a paper-tube-making machine, the combination, with a supply-spool adapted to supply material to a rotating mandrel at an angle to the direction of the axis of the mandrel, of a receptacle adapted to receive paste, guides for guiding the supply from said supply-spool to and through said receptacle to the mandrel, and means for adjusting said supply-spool and receptacle to the required angle with the axis of the mandrel, substantially as set forth.

29. In a paper-tube-making machine, the combination, with a pair of spools, each adapted to supply a tape for the tube being formed, of a pair of receptacles adapted to receive paste, one arranged behind the other, and the rearward receptacle adapted to swing in a vertical plane independent of the forward one, substantially as set forth.

30. In a paper-tube-making machine, the combination, with a spool adapted to supply material at an angle to the axis of the mandrel, of a receptacle adapted to receive paste, a roller in said receptacle adapted to be partially submerged in said paste, guides for guiding said material over the top of said roller, a second roller adapted to press upon said first-mentioned roller, a pivoted frame wherein said second roller is mounted, and means for regulating the degree of pressure between the rollers, substantially as set forth.

This specification signed and witnessed this 28th day of May, 1889.

DANIEL N. HURLBUT.

Witnesses:
D. H. DRISCOLL,
WILLIAM PELZER.